June 5, 1923.
G. A. LYON
VEHICLE BUFFER DEVICE
Filed Nov. 17, 1920
1,457,532
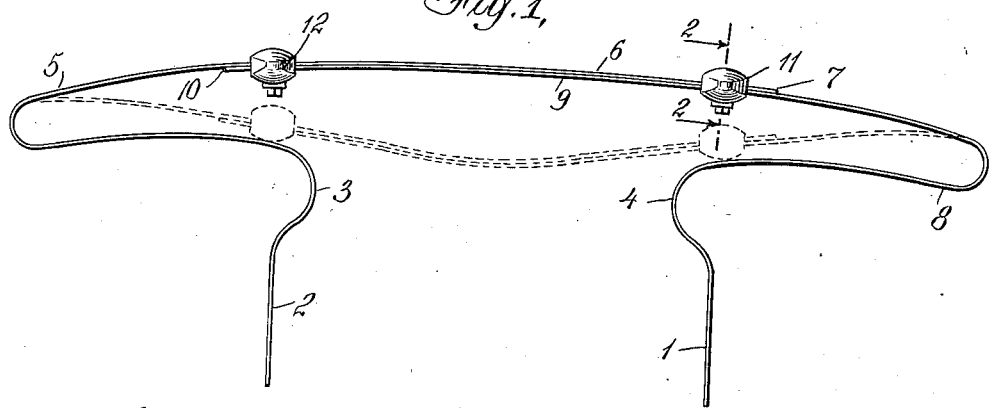
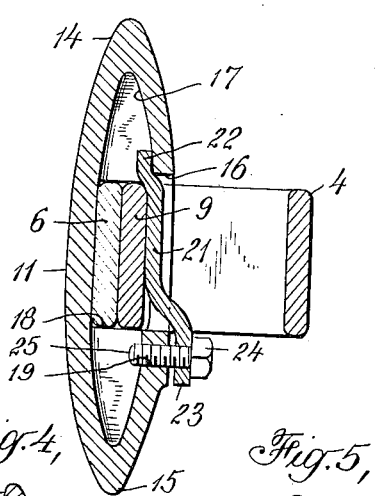
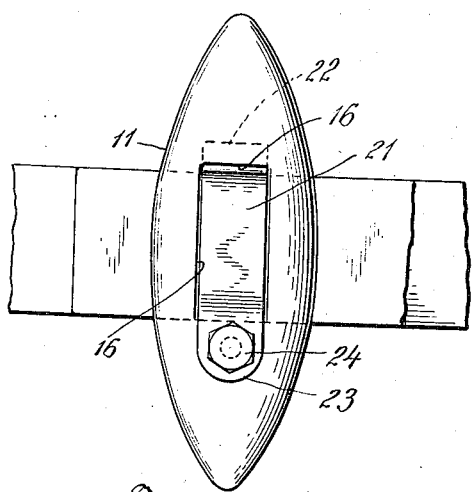
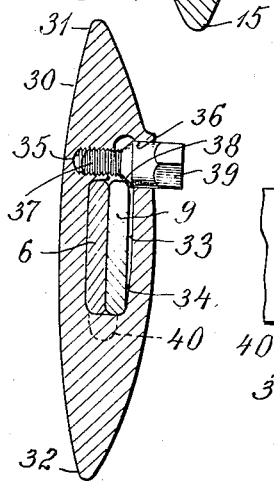
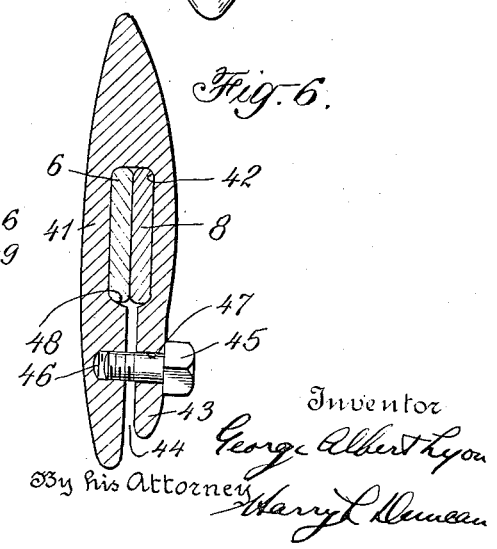
Inventor
George Albert Lyon
By his Attorney Patented June 5, 1923.

1,457,532

UNITED STATES PATENT OFFICE.

GEORGE ALBERT LYON, OF PHILADELPHIA, PENNSYLVANIA.

VEHICLE BUFFER DEVICE.

Application filed November 17, 1920. Serial No. 424,685.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Vehicle Buffer Devices, of which the following is a specification, taken in connection with the accompanying drawing, which forms part of the same.

This invention relates especially to resilient buffer or bumper devices for automobiles or other vehicles in which the spring steel or other resilient strips or members are provided with vertically extending contact devices which may also advantageously serve as the clamping devices to secure or adjustably connect the buffer strips. Such vertically extending clamping devices which preferably have a substantially flat or vertical front collision face, which may be six or eight inches more or less in a vertical direction, may enclose the overlapping front strips of the regular Lyon type automobile buffer for example and securely hold them in their desired adjusted position as by suitable clamping bolts or devices. Under collision conditions these contact devices have ample vertical extent so that they make effective contact with the buffer of the other automobile for example and furthermore may be so arranged or located as to make definite and effective contact with one of the rearward buffer strips after the front strips have been forced back so as to positively prevent these front strips riding over the rearward supporting strips of the resilient buffer even under considerable vertical forces.

In the accompanying drawings showing in a somewhat diagrammatic way various illustrative embodiments.

Fig. 1 is a plan view of the buffer.

Fig. 2 is an enlarged vertical section taken substantially along the line 2—2 of Fig. 1; and Fig. 3 is a corresponding rear view of the contact and clamping devices.

Fig. 4 is a transverse sectional view showing a modified form of contact and clamping device; and Fig. 5 is a corresponding rear view thereof.

Fig. 6 is a transverse sectional view showing a modified form of contact and clamping device.

The automobile buffer may have any desired or suitable construction and preferably comprises spring steel strips which may be arranged in overlapping reinforced position in the front of the buffer. As indicated a Lyon type spring buffer is shown as comprising the attaching arm or member such as 1, connected with the corresponding end loop 8 and if desired formed with an inwardly extending bend or curved portion 4 as indicated. The front or impact receiving portion 9 of this strip of spring steel or other suitable or resilient material preferably extends to about the point 10, so as to have an adjustable overlapping engagement with the other corresponding front strip 6 which may end at about the point 7. The end loop 5 of this other strip may be joined to the attaching arm 2 through the inward extending bent portion 3 if desired.

Instead of the usual clamping devices these front impact receiving portions of the buffer may be adjustably connected by suitable vertically extending contact and clamping devices such as 11, 12 which are preferably though not necessarily located in front of a supporting strip or portion of the buffer. As shown in Figs. 2 and 3 the contact and clamping device 11 preferably has a relatively flat front or collision face which may if desired be slightly curved rearward adjacent the contact ends 14, 15. The device which may be formed in any desired way as by casting it from cast iron or steel may be provided with lateral openings 18 on each side for the overlapping front strips of the buffer and with a clamping recess 16, which may also communicate with the hollow interior 17 to give greater lightness to the device. The front strips preferably fit fairly tightly within the lateral openings 18 and may be securely clamped or held therein by any desired clamping means such for example as the curved resilient clamping tongue 21, which may have its inner end 22 locked around the inside of the contact device while its adjacent curved portion may be yieldingly forced against the adjacent front strip 9, by screwing down the end 24 of the clamping bolt 25 engaging threaded hole 19 in the contact device. In this way a strong clamping action can be secured which also resiliently holds the parts in position and prevents rattling while leaving the rear face of the contact device substantially free adjacent its central portion, so that it naturally and readily comes into flat and normal engagement with the rearward buffer strip 4. Under collision conditions these parts are pushed together as is diagrammatically indicated by the dotted lines in Fig. 1.

These contact and clamping devices may thus definitely regulate the closing of the buffer end loops under collision conditions and also have sufficient vertical extent to prevent any injury to the automobile which might be caused by an unusually positioned buffer on a colliding vehicle. At the same time these contact clamping devices are very easy to put in place and have fully as good clamping and securing action on the adjustable or other buffer strips as is secured by the usual clips or other clamping bolts or devices now employed.

Another form of such contact and clamping devices is shown in Figs. 4 and 5, the contact device 30 there being shown with a still straighter front or collision face which is very nearly vertical between its upper and lower contact ends 31, 32. The lateral opening 33 formed in this contact device is arranged to accommodate the overlapping front strips of the buffer such as 6, 9 and if desired these strips may be securely clamped or held in adjusted position by any suitable clamping bolts or devices cooperating with this contact device. As shown in Fig. 4 the lateral openings 33 may be formed with an angular or wedge shape end 34 adjacent one end and a clamping or wedging screw 37 may be arranged to cooperate with a threaded hole 35 in the other end of such lateral openings. This clamping screw which may have a square or polygonal head 39 to rotate the same, may in some cases be formed with a conical or wedging portion 36 so positioned as to engage and wedge downward the adjacent buffer strip 9, so that it will be simultaneously forced at its opposite edge against the wedging or inclined portion 34 of the lateral opening and thus be securely clamped or held in place. Such an arrangement, in which one or more such clamping or wedging screws or bolts may be used, causes correspondingly little weakening of the contact device, which may thus be made considerably narrower and lighter as is shown in Fig. 5. If desired however lateral projections or aligning brackets 40 may be cast or formed on the contact devices so as to project laterally therefrom and engage one of the edges of the buffer strips to prevent undesirable tilting when the contact device is adjusted. Of course by arranging these brackets beneath the buffer strips they are not unsightly or objectionable and can effectively exert the desired aligning action in this substantially concealed position. In the Fig. 6 device the contact member 41 may be cast in one piece with a recess 42 preferably having angular clamping or wedging faces 48 to engage the edges of the buffer strips 6 and 8. The rear lower end 43 may be formed with a hole 47 to accommodate the shank of the tightening bolt 45, and when this bolt is screwed into the threaded hole 46 the cast or cored slot 44 may be closed enough so as to securely clamp the device on the buffer strips.

This invention has been described in connection with a number of embodiments, forms, proportions, parts, arrangements, materials, methods of manufacture, connection and use, to the details of which disclosure the invention is not of course to be limited, since what is claimed as new and what is desired to be secured by Letters Patent is set forth in the appended claims.

I claim—

1. The automobile buffer formed of spring steel strip and comprising attaching arms and connected end loops secured to said attaching arms through inwardly extending curved portions and connected adjustably overlapping front strips, and a pair of vertically extending contact and clamping devices formed with lateral openings for said front strips and with resilient clamping tongues and bolts to resiliently and securely clamp said front strips and contact devices together.

2. The hollow cast metal vertically extending contact and clamping device adapted for use with spring strip automobile buffers and comprising a relatively flat front collision face and vertically extending reduced width contact ends, said contact device being formed with a lateral opening adapted to receive the buffer strips and formed with an adjacent clamping recess in the rear of said device and cooperating clamping means comprising a curved spring steel clamping tongue having an end adapted to lock within the contact device and a clamping bolt passing through a hole in the other end of said clamping tongue to force the same down into clamping engagement with a buffer strip.

3. The hollow cast metal vertically extending contact and clamping device adapted for use with spring strip automobile buffers, said contact device being formed with a lateral opening adapted to receive the buffer strips and formed with an adjacent clamping recess in the rear of said device and cooperating clamping means comprising a clamping tongue having an end adapted to lock within the contact device and a clamping bolt to force the same down into clamping engagement with a buffer strip.

4. The hollow vertically extending contact and clamping device adapted for use with spring strip automobile buffers, said contact device being formed with a lateral opening adapted to receive the buffer strips and cooperating clamping means comprising a clamping bolt to force the same down into clamping engagement with a buffer strip.

5. The cast metal contact and clamping device adapted to extend vertically in connection with the front member of spring strip automobile buffers, said contact device being formed with a lateral opening adapted to receive the buffer strips and formed with a communicating clamping recess in the rear of said device and cooperating clamping means comprising a lever action clamping tongue having an end adapted to lock within the contact device and a clamping bolt cooperating with a hole in the other end of said clamping tongue to hold the same into clamping engagement with the buffer member.

6. The contact and clamping device adapted to extend vertically in connection with the front member of automobile buffers, said contact device being formed with a lateral opening adapted to receive the buffer and formed with a communicating clamping recess in the rear of said device and cooperating clamping means comprising a lever action clamping tongue and a clamping bolt cooperating with the other end of said clamping tongue to hold the same into clamping engagement with the buffer member.

GEORGE ALBERT LYON.